(12) United States Patent
Zacharie et al.

(10) Patent No.: US 7,086,300 B1
(45) Date of Patent: Aug. 8, 2006

(54) LARGE STROKE LINEAR MOTION FLEXURAL APPARATUS

(75) Inventors: Donald F. Zacharie, Sunnyvale, CA (US); Kenneth R. Lorell, Los Altos, CA (US); Jean-Noel Auburn, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 319 days.

(21) Appl. No.: 10/412,565

(22) Filed: Apr. 11, 2003

(51) Int. Cl.
*F16H 61/06* (2006.01)

(52) U.S. Cl. .................................. 74/17.5; 74/17.8
(58) Field of Classification Search .............. 74/17.5, 74/17.8, 18, 18.1, 18.2, 27; 192/88 A
See application file for complete search history.

(56) References Cited

U.S. PATENT DOCUMENTS

| | | | | |
|---|---|---|---|---|
| 5,199,542 A | * | 4/1993 | Flotow | 192/88 A |
| 5,379,856 A | * | 1/1995 | Blee | 180/400 |
| 5,535,869 A | * | 7/1996 | Bigley et al. | 192/69.41 |
| 5,562,005 A | * | 10/1996 | Boyen et al. | 74/18.2 |
| 5,887,692 A | * | 3/1999 | Zelikov et al. | 192/91 R |
| 6,697,043 B1 | * | 2/2004 | Shahoian | 345/156 |

\* cited by examiner

*Primary Examiner*—David Fenstermacher
(74) *Attorney, Agent, or Firm*—McDermott Will & Emery LLP

(57) ABSTRACT

Embodiments of the present invention are directed to a linear motion flexural apparatus to provide friction-free linear travel for large stroke motion. In one embodiment, a linear motion flexural apparatus comprises a first member having a first surface, and a second member having a second surface which is spaced from the first surface of the first member. One of the first member and the second member is movable relative to another one of the first member and the second member in a linear direction. At least one sheet is disposed between the first surface of the first member and the second surface of the second member. Each sheet has a first edge portion and a second edge portion generally opposite from the first edge portion. The first edge portion is attached to the first surface of the first member. The second edge portion is attached to the second surface of the second member. Each sheet has a curved portion with a shape which is substantially unchanged during movement between the first member and the second member in the linear direction.

9 Claims, 5 Drawing Sheets

LARGE STROKE LINEAR MOTION FLEXURAL APPARATUS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

BACKGROUND OF THE INVENTION

The present invention relates generally to motion devices and, more particularly, to linear motion flexural apparatus and components.

Linear motion mechanisms are common and come in a variety of configurations. Many conventional mechanisms employ either rolling or sliding contacts, which generate friction and/or stiction. The use of bearings and/or lubricants are typically needed to reduce wear and tear. For instance, current devices used to mechanically translate optomechanical or other precision components typically use ways or slides with preloaded mechanical rollers or bearings. The precision ways provide the guidance for the moving element and the rollers or bearings are used to minimize friction. A preload is required so that there is no unconstrained transverse motion during translation. Some of the problems associated with such a conventional mechanism are that it requires lubrication, has friction in its moving components which cannot be completely eliminated, is heavy in weight, has cleanliness issues in both a vacuum environment and an optical system environment, and has a finite wear life due to lubricant and friction issues. The mechanism likely will not be able to achieve nanometer accuracy in motion. These problems are particularly significant in space flight applications.

BRIEF SUMMARY OF THE INVENTION

Embodiments of the present invention are directed to a linear motion flexural apparatus to provide friction-free linear travel for large stroke motion without the use of bearings or lubricants and eliminating the problems of friction and stiction, thus enhancing precision motion, eliminating lubricants and associated contamination problems, and allowing for almost unlimited operating life. This is especially important in space borne and vacuum optical applications where cleanliness, long life, rugged, simple construction, and low power requirements dominate the design criteria. A typical application is for an optical path length control device used in multi-aperture optical systems. These devices are configured to move over large distances on a continual basis to equalize the optical path length among the various legs of the multi-aperture system. In addition, the devices need to move at high bandwidth and to be positioned with nanometer accuracy. These requirements render it nearly impossible to use conventional translational devices without a second, auxiliary stage required to do the fine positioning. Such as second or auxiliary stage is not required with the system of the present invention.

The apparatus employs one or more thin flexural sheets that are attached to a pair of spaced members which are movable relative to one another back and forth in a sliding configuration. The flexural sheets each have a curved portion between the two spaced members, and typically deform elastically during movement between the two members. The flexural sheets produce essentially zero friction and provide very low stiffness in the direction of motion.

In accordance with an aspect of the present invention, a linear motion flexural apparatus comprises a first member having a first surface, and a second member having a second surface which is spaced from the first surface of the first member. One of the first member and the second member is movable relative to another one of the first member and the second member in a linear direction. At least one sheet is disposed between the first surface of the first member and the second surface of the second member. Each sheet has a first edge portion and a second edge portion generally opposite from the first edge portion. The first edge portion is attached to the first surface of the first member. The second edge portion is attached to the second surface of the second member. Each sheet has a curved portion with a U-shape during movement between the first member and the second member in the linear direction.

In some embodiments, the first surface of the first member is parallel to the second surface of the second member, and the linear direction is parallel to the first surface and the second surface. The first surface of the first member and the second surface of the second member are spaced by a fixed distance during movement between the first member and the second member in the linear direction. Each sheet has a curved portion with a U-shape which is substantially unchanged during movement between the first member and the second member in the linear direction. The sheet is elastic with substantially no plastic deformation during movement between the first member and the second member in the linear direction. The distance between the first surface of the first member and the second surface of the second member can be any distance. The radius of the curvature of the flexural sheet is desirably kept at a value that does not cause the material of the sheet to become overstressed in the region of the curvature. In one example, the distance between the first surface and the second surface is at least about 100 times equal to a thickness of the sheet.

In accordance with another aspect of the present invention, a linear motion flexural apparatus comprises a first member having a first surface, and a second member having a second surface which is spaced from the first surface of the first member. One of the first member and the second member is movable relative to another one of the first member and the second member in a linear direction. At least one sheet is disposed between the first surface of the first member and the second surface of the second member. Each sheet has a first edge portion and a second edge portion generally opposite from the first edge portion. The first edge portion is attached to the first surface of the first member. The second edge portion is attached to the second surface of the second member. The first surface of the first member is parallel to the second surface of the second member, and the linear direction is parallel to the first surface and the second surface.

In accordance with another aspect of the invention, a linear motion flexural apparatus comprises a first member having a first surface, and a second member having a second surface which is spaced from the first surface of the first member. One of the first member and the second member is movable relative to another one of the first member and the second member in a linear direction. A plurality of sheets are disposed between the first surface of the first member and the second surface of the second member. Each sheet has a first edge portion and a second edge portion generally opposite from the first edge portion. The first edge portion is attached to the first surface of the first member. The second edge portion is attached to the second surface of the second member. The plurality of sheets include curved portions which have generally parallel lines of focus disposed between the first surface of the first member and the second surface of the second member.

In some embodiments, the lines of focus lie on a plane. The first surface of the first member is parallel to the second surface of the second member, and the linear direction is parallel to the first surface and the second surface. The curved portions of the plurality of sheets are spaced from each other in a direction generally perpendicular to the lines of focus. The curved portions of the plurality of sheets are sufficiently spaced from each other so that at least substantial parts of the curved portions do not contact each other during movement between the first member and the second member in the linear direction. The first edge portions of the plurality of sheets are generally aligned with each other and the second edge portions of the plurality of sheets are generally aligned with each other.

In accordance with another aspect of the present invention, a linear motion flexural system comprises a first member having a plurality of first member surfaces which are nonparallel to each other and are parallel to an axis of the first member. A plurality of second members each have a second member surface which is spaced from one of the first member surfaces of the first member and which is a corresponding second member surface for the first member surface. The plurality of second members are movable relative to the first member in a linear direction. At least one sheet is disposed between each first member surface and the corresponding second member surface. Each sheet has a first edge portion and a second edge portion generally opposite from the first edge portion. The first edge portion is attached to the first member surface. The second edge portion is attached to the corresponding second member surface.

DETAILED DESCRIPTION OF THE INVENTION

Figure 1:
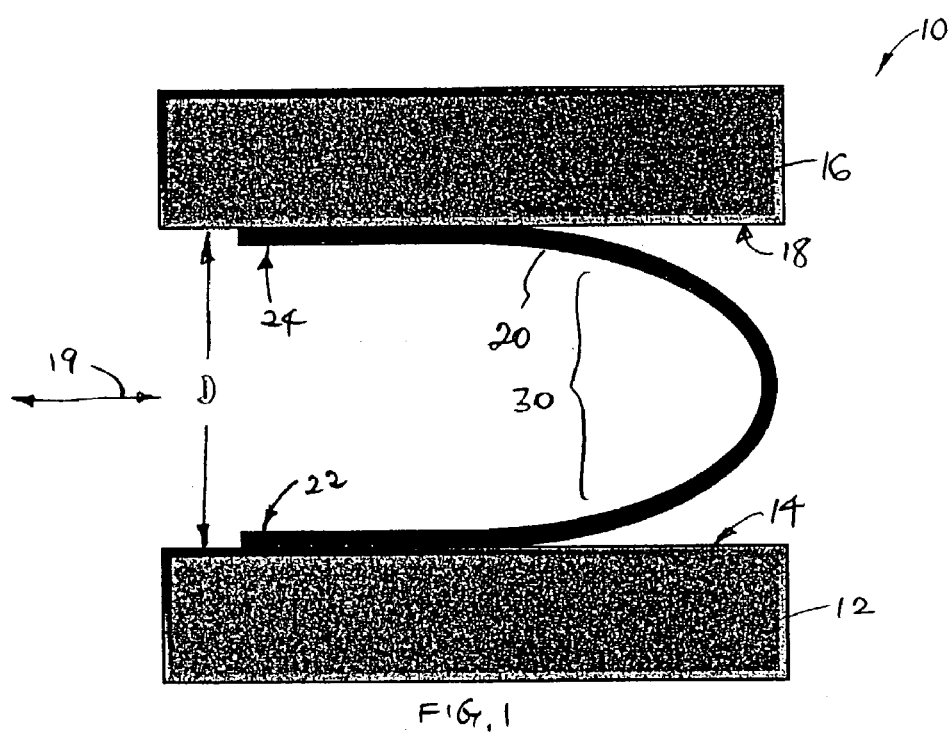
FIG. 1 is a simplified elevational view of a linear motion flexural unit according to an embodiment of the present invention.
Figure 2:
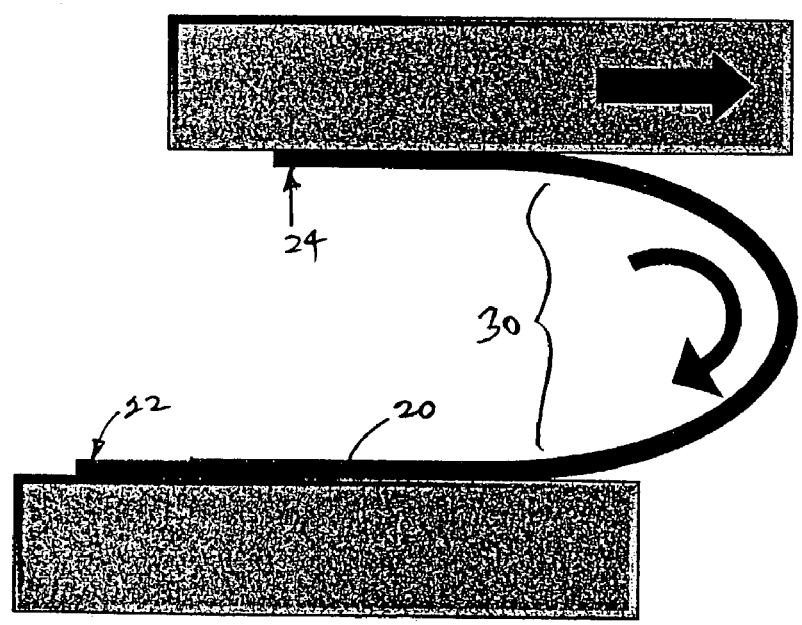
FIGS. 2 and 3 are simplified elevational views of the linear motion flexural unit of FIG. 1 moving in opposite directions of travel.
Figure 3:
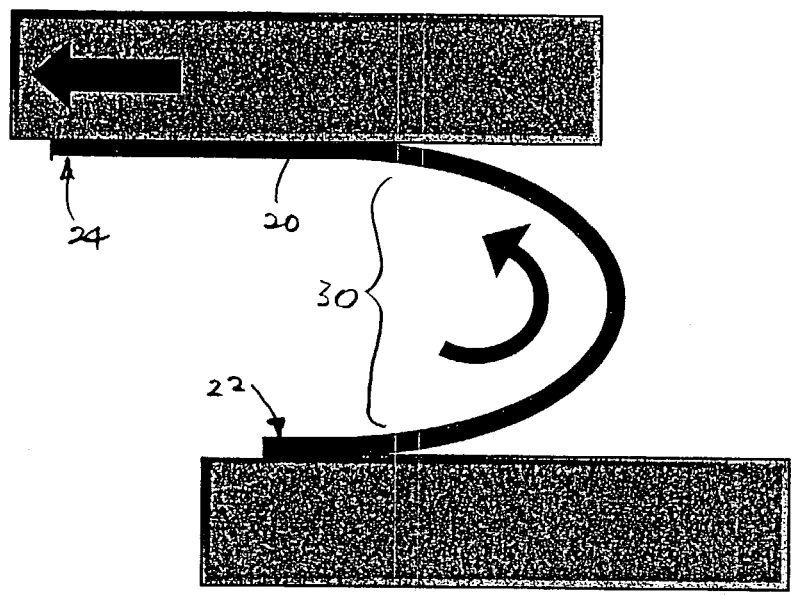
Figure 4:
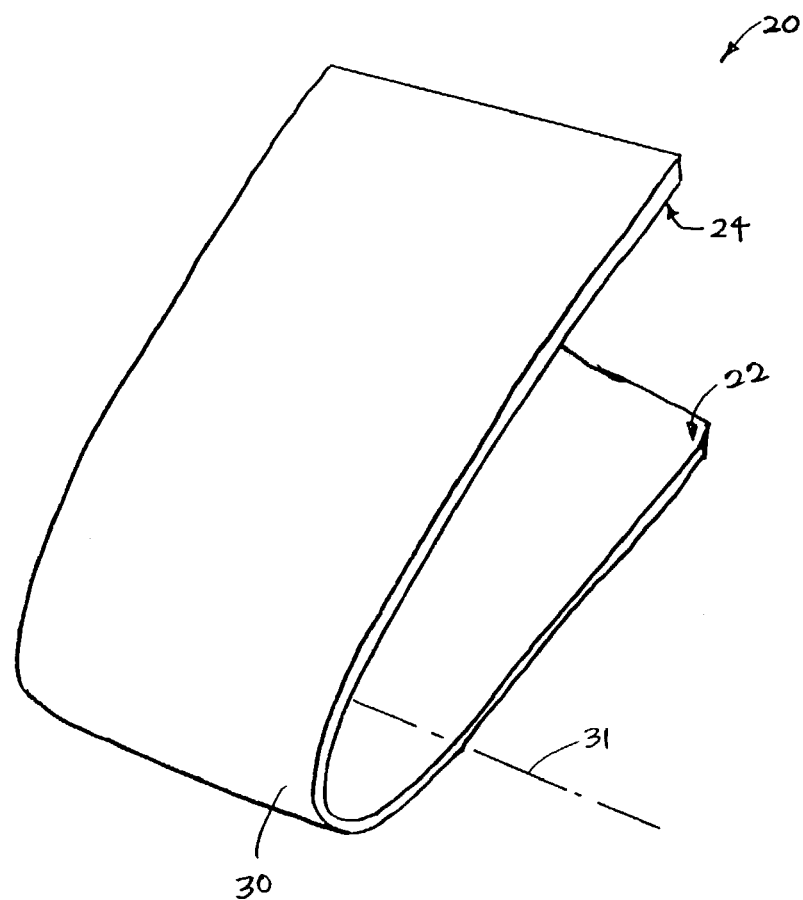
FIG. 4 is a perspective view of a flexural sheet in the linear motion flexural unit of FIG. 1.

FIG. 1 shows a linear motion device 10 which includes a first member 12 having a first surface 14 and a second member 16 having a second surface 18 which is spaced from the first surface 14. The first member 12 is movable relative to the second member 16 in a linear direction 19. One of the first member 12 and the second member 16 may be fixed, and the other is movable. Alternatively, both the first member 12 and the second member 16 may be movable. FIGS. 2 and 3 illustrate movement of the second member 16 with respect to the first member 12. A sheet of material or flexural member 20 is disposed between the first surface 14 and the second surface 18. The sheet 20 includes a first edge portion 22 and a second edge portion 24 which are disposed on generally opposite sides of the sheet 20. The first edge portion 22 is attached to the first surface 14 of the first member 12, and the second edge portion 24 is attached to the second surface 18 of the second member 16. The sheet 20 includes a curved portion 30 disposed between the edge portions 22, 24. The curved portion 30 is U-shaped or C-shaped. As seen in FIGS. 1–3, the location of the curved portion 30 on the sheet 20 changes as the sheet 20 deforms with the relative movement between the first member 12 and the second member 16. The legs of the flexural member 20 on opposite sides of the curved portion 30 alternately become longer or shorter as the first member 12 and the second member 16 move back and forth with respect to one another. In the embodiment shown, the shape of the curved portion 30 remains substantially unchanged during movement between the first member 12 and the second member 16. If the curved portion 30 is circular, it will have a generally constant radius of curvature. In some cases, the shape of the curved portion 30 may be closer to a parabola, or an ellipse, or the like. FIG. 4 shows a perspective view of the sheet or flexural member 20. The curved portion 30 is bent around a line of focus 31. For a parabola or an ellipse, the line of focus 31 is mathematically defined. For a circle, the line of focus 31 is the center line of curvature.

In the embodiment shown in FIGS. 1–4, the first surface 14 of the first member 12 is parallel to the second surface 18 of the second member 16. The linear direction of travel 19 is parallel to the first and second surfaces 14, 18. The first surface 14 and the second surface 18 are spaced by a fixed distance D during movement between the first member 12 and the second member 16. The first edge portion 22 and the second edge portion 24 are parallel to one another during movement between the first member 12 and the second member 16. The sheet 20 is typically a flat sheet when formed, and is bent in the curved portion 30 when assembled. The sheet 20 desirably is elastic with substantially no plastic deformation or yielding during movement between the first member 12 and the second member 16. It may be made of a metal such as stainless steel. To remain elastic, the sheet 20 is thin. The thickness of the sheet 20 depends on the shape of the curved portion 30 which is a function of the distance D between the first and second surfaces 14, 18, the properties of the material used for the flexural sheet 20 (e.g., the yield strength), and the thickness of the sheet 20. There is no theoretical limit as to the amount or distance of travel in the linear direction 19, although there are practical limits related to size, weight and ease of fabrication. Typical distance of travel in the linear direction is on the order of plus or minus 100 mm. In some embodiments where the material is stainless steel, the width of the sheet 20 is about 10 cm, the distance D is about 15 mm, and the thickness is about 25 to 50 µm.

Figure 5:
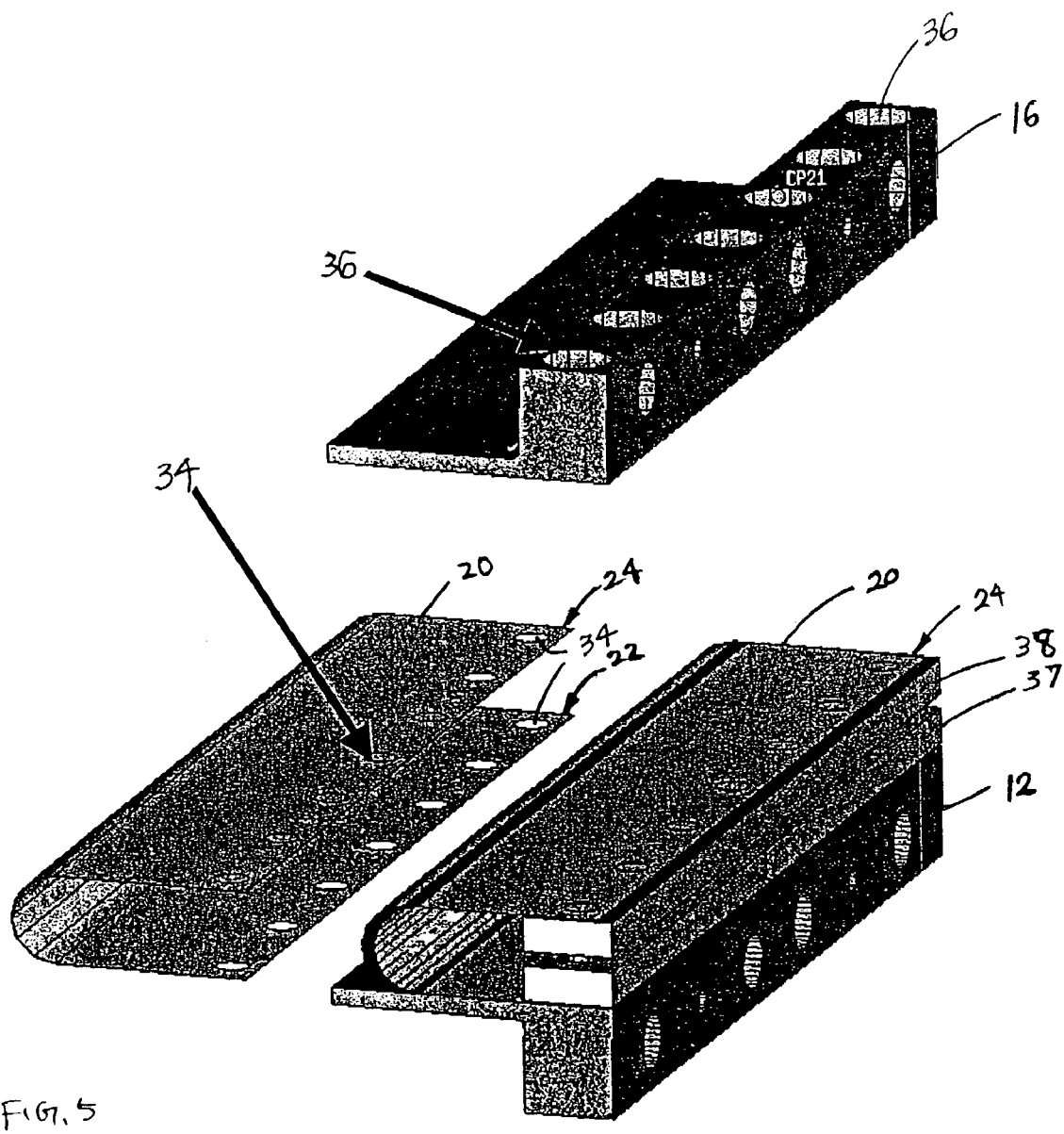
FIG. 5 is an exploded view of a linear motion flexural unit according to another embodiment of the invention.

FIG. 5 shows one example of the assembly for attaching the flexural sheet 20 to the first member 12 and the second member 16. The sheet 20 includes a plurality of apertures 34 along the first edge portion 22 and the second edge portion 24. The first member 12 and the second member 16 have holes 36 corresponding to the apertures 34 of the sheet 20.

The attachment assembly further includes a first attachment member or beam 37 and a second attachment member or beam 38, which also include holes corresponding to the apertures 34 of the sheet 20. The first edge portion 22 is sandwiched between the first member 12 and the first attachment beam 37, and are attached by a plurality of fasteners such as bolts and nuts or the like. The second edge portion 24 is sandwiched between the second member 16 and the second attachment beam 38, and are attached by a plurality of fasteners.

The linear motion flexural apparatus 10 provides essentially zero friction and very low stiffness in the direction of motion. The configuration allows the flexural sheet 20 to move back and forth over large distances with only the curved portion 30 of the flexural sheet 20 actually flexing at any one instant.

Figure 6:
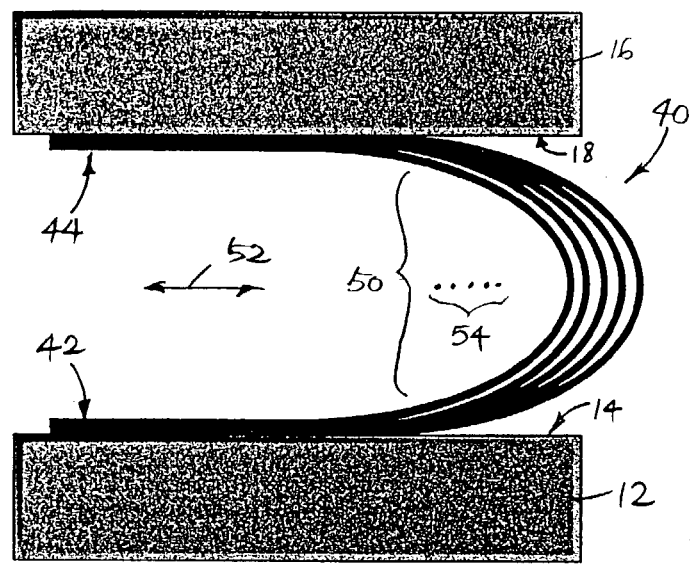
FIG. 6 is a simplified elevational view of a linear motion flexural unit according to another embodiment of the present invention.

The use of a single flexural sheet 20 may not provide sufficient transverse stiffness, or may generate a high stress in the sheet 20 that is close to the yield strength of the material of the sheet 20. In another embodiment as shown in FIG. 6, multiple flexural sheets 40 are used in a single flexural unit to provide high transverse stiffness and to reduce the amount of stress in each sheet 40. The first edge portions 42 of the sheets 40 are attached to the first surface 14 of the first member 12, and the second edge portions 44 of the sheets 40 are attached to the second surface 18 of the second member 16. The sheets 40 may have the same thickness and curved portions 50 may have the same shape.

Figure 7:
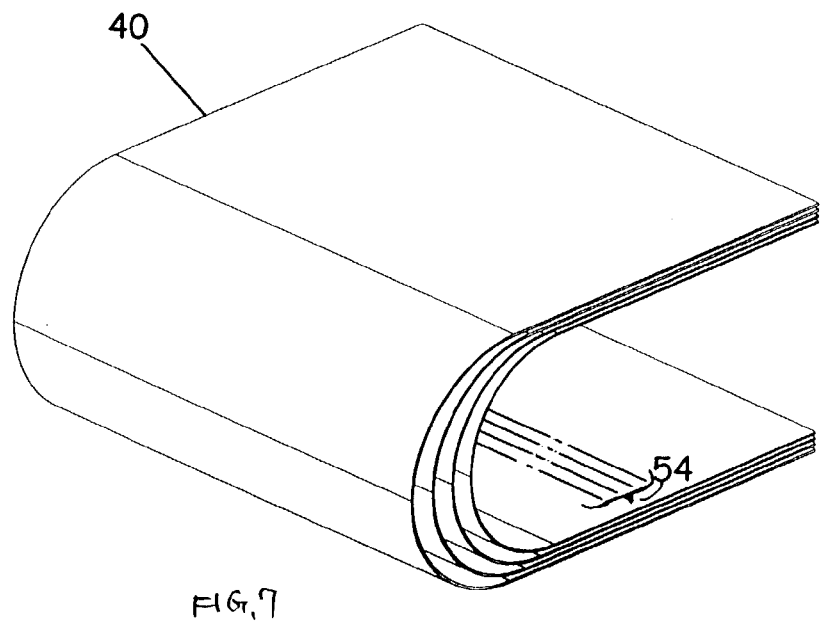
FIG. 7 is a perspective view of multiple flexural sheets in the linear motion flexural unit of FIG. 6.

The curved portions 50 of the sheets 40 are spaced from each other in a direction which is generally perpendicular to the lines of focus 54 of the curved portions 50 and which is also the direction of travel 52 between the first member 12 and the second member 16. In the embodiment shown, the lines of focus 54 are parallel to each other, and lie on a plane disposed between the first surface 14 and the second surface 18, which may be the mid-plane spaced equally between the first surface 14 and the second surface 18. This is seen in FIGS. 6 and 7. The sheets 40 desirably are sufficiently spaced from each other so that at least substantial parts of the curved portions 50 do not contact each other during movement between the first member 12 and the second member 16 in the linear direction 52. For instance, the space between adjacent sheets 40 is designed to be on the order of 100 μm or so. Although this distance is not critical, it is desirable to keep the distance at about this number, or larger, in order to facilitate the assembly process. The first edge portions 42 may be aligned with each other, and the second edge portions 44 may be aligned with each other. In that case, each sheet 40 is slightly longer than the adjacent sheet to the left thereof as seen in FIG. 6.

By combining a plurality of sheets 40 into a single flexural unit, it is possible to simultaneously achieve high transverse stiffness, low stress in individual flexural sheets 40, and essentially zero friction and very low stiffness in the direction of motion 52. The flexing of the sheets 40 occur at the curved portions 50 only. The geometry and mounting of the sheets 40 are precisely controlled to prevent contact of the curved portions 50 of the sheets 40. The compound flexure has an inherent transverse stiffness comparable to that of a much thicker single piece of flexure material while the stress buildup in the curved portion of each flexural sheet 40 is kept within acceptable limits. Because the sheets 40 do not contact as they bend to form the curved portions 50, there is no wear, no particle generation and contamination, and no friction. In addition, because the motion is flexural rather than rolling or sliding, there is no stiction or friction. This feature is highly important for applications in which nanometer level control is essential. The flexural sheets are light in weight, easy to assemble and maintain, and less expensive than conventional roller bearing slides.

Figure 8:
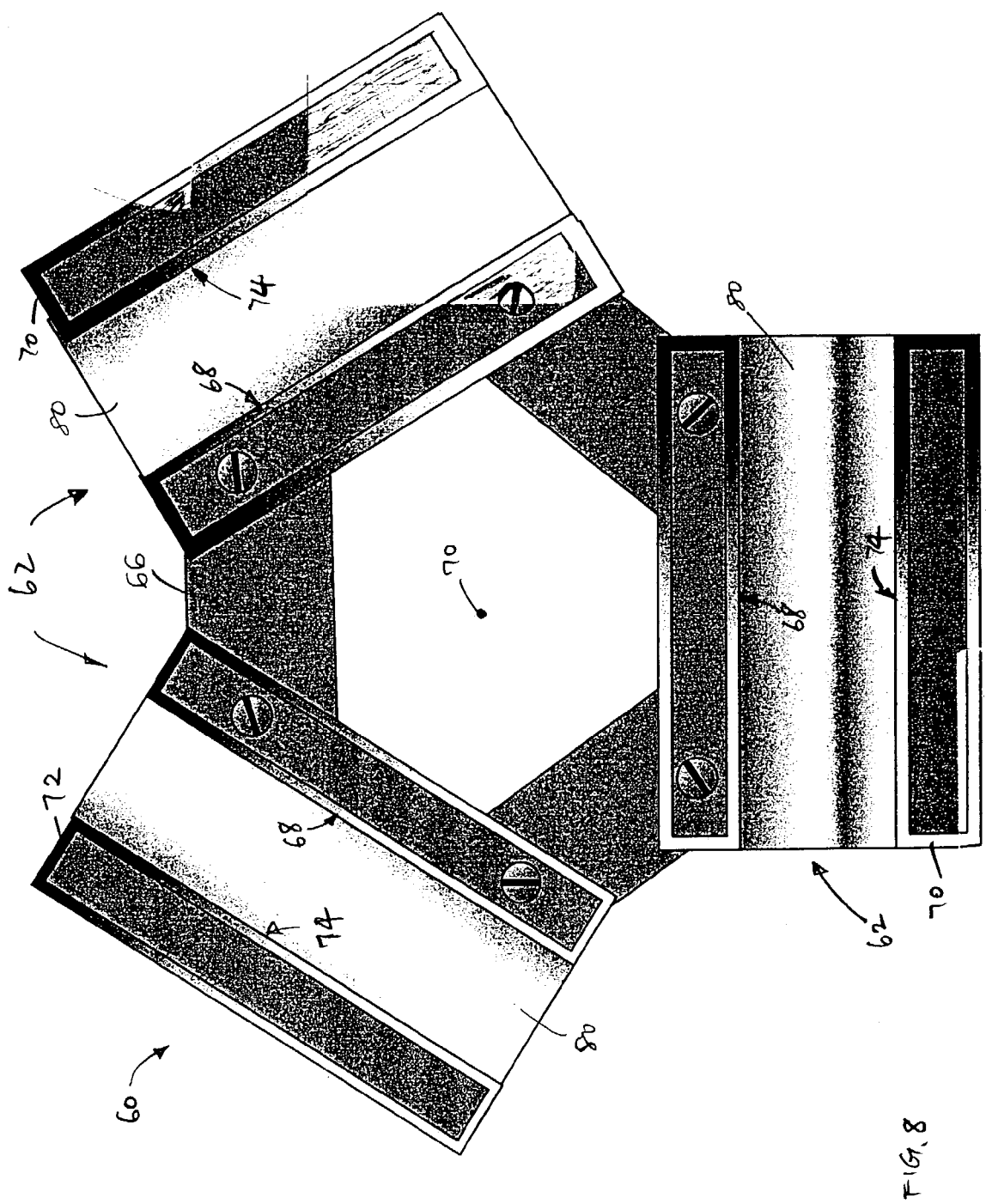
FIG. 8 is a simplified end view of a linear motion flexural system according to another embodiment of the present invention.

FIG. 8 shows a flexural system 60 formed by three flexural units 62 arranged in a triangular shape. In another embodiment, four flexural units may be arranged in a square or rectangular shape. In general, the flexural units are arranged in a closed polygonal format, with one flexural unit forming each side around the perimeter of the polygon, although other arrangements of the flexural units may be employed instead. The polygon is referred to as the first member 66, and includes a plurality of first member surfaces 68 which are parallel to the axis 70 of the polygon 66. Three second members 72 have three corresponding second member surfaces 74 that are spaced from the first member surfaces 68. The second members 72 are movable relative to the first member 66 in a linear direction, which is typically parallel to the axis 70. One or more flexural sheets 80 are disposed between each first member surface 68 and the corresponding second member surface 74. The sheets 80 can be arranged and attached as shown in the embodiments of FIGS. 1–7. Typically, the flexural units 62 are identical.

The use of a set of several flexural units 62 to form a flexural system 60 further ensures that the system 60 has adequate mechanical stiffness in directions transverse to the desired direction of motion along the axis 70. In use, typically a pair of the flexural systems 60 are spaced along the axis 70 to form a linear motion apparatus and to support a shaft or the like between the flexural systems 60 to move along the axis 70. Such a linear motion apparatus can provide a long stroke with no friction and low force as well as high transverse stiffness perpendicular to the direction of motion.

The above-described arrangements of apparatus and methods are merely illustrative of applications of the principles of this invention and many other embodiments and modifications may be made without departing from the spirit and scope of the invention as defined in the claims. For instance, the flexural sheets may have other shapes and may be attached to the first and second members using other mechanisms (e.g., adhesives). Multiple flexural units may be arranged in different configurations to form a single flexural system. The scope of the invention should, therefore, be determined not with reference to the above description, but instead should be determined with reference to the appended claims along with their full scope of equivalents.

What is claimed is:

1. A linear motion flexural apparatus comprising:
    a first member having a first surface;
    a second member having a second surface which is spaced from the first surface of the first member, one of the first member and the second member being movable relative to another one of the first member and the second member in a linear direction; and
    at least one sheet disposed between the first surface of the first member and the second surface of the second member, each sheet having a first edge portion and a second edge portion generally opposite from the first edge portion, the first edge portion being attached to the first surface of the first member, the second edge portion being attached to the second surface of the second member, each sheet having a curved portion with a U-shape which is substantially unchanged during movement between the first member and the second member in the linear direction.

2. The apparatus of claim 1 wherein the first surface of the first member is parallel to the second surface of the second member, and wherein the linear direction is parallel to the first surface and the second surface.

3. The apparatus of claim 1 wherein the first surface of the first member and the second surface of the second member are spaced by a fixed distance during movement between the first member and the second member in the linear direction.

4. The apparatus of claim 1 wherein the at least one sheet is elastic with substantially no plastic deformation during movement between the first member and the second member in the linear direction.

5. The apparatus of claim 1 comprising a plurality of sheets including curved portions which have generally parallel lines of focus lying on a plane disposed between the first surface of the first member and the second surface of the second member.

6. The apparatus of claim 5 wherein the curved portions of the plurality of sheets are spaced from each other in a direction generally perpendicular to the lines of focus.

7. The apparatus of claim 6 wherein the curved portions of the plurality of sheets are sufficiently spaced from each other so that at least substantial parts of the curved portions do not contact each other during movement between the first member and the second member in the linear direction.

8. The apparatus of claim 5 wherein the first edge portions of the plurality of sheets are generally aligned with each other and the second edge portions of the plurality of sheets are generally aligned with each other.

9. The apparatus of claim 1 wherein the distance between the first surface of the first member and the second surface of the second member is at least about 100 times equal to a thickness of the sheet.

* * * * *

UNITED STATES PATENT AND TRADEMARK OFFICE
CERTIFICATE OF CORRECTION

| | |
|---|---|
| PATENT NO. | : 7,086,300 B1 |
| APPLICATION NO. | : 10/412565 |
| DATED | : August 8, 2006 |
| INVENTOR(S) | : Donald F. Zacharie et al. |

It is certified that error appears in the above-identified patent and that said Letters Patent is hereby corrected as shown below:

TITLE PAGE

Under (75) Inventors, "Jean-Noel Auburn" should read --Jean-Noel Aubrun--.

Signed and Sealed this

Seventh Day of August, 2007

JON W. DUDAS
*Director of the United States Patent and Trademark Office*